United States Patent
Kitaji

(10) Patent No.: US 10,365,623 B2
(45) Date of Patent: Jul. 30, 2019

(54) SERVER, USER TERMINAL, AND PROGRAM

(71) Applicant: KYOCERA CORPORATION, Kyoto-shi, Kyoto (JP)

(72) Inventor: Mitsuhiro Kitaji, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/537,554

(22) PCT Filed: Dec. 21, 2015

(86) PCT No.: PCT/JP2015/085634
§ 371 (c)(1),
(2) Date: Jun. 19, 2017

(87) PCT Pub. No.: WO2016/104402
PCT Pub. Date: Jun. 30, 2016

(65) Prior Publication Data
US 2017/0343973 A1 Nov. 30, 2017

(30) Foreign Application Priority Data

Dec. 25, 2014 (JP) .............................. 2014-261801
Apr. 24, 2015 (JP) .............................. 2015-089854

(51) Int. Cl.
*G05B 19/042* (2006.01)
*G06Q 50/06* (2012.01)
(Continued)

(52) U.S. Cl.
CPC .......... *G05B 19/042* (2013.01); *G06Q 50/06* (2013.01); *H02J 3/14* (2013.01); *H02J 13/00* (2013.01); *G05B 2219/2639* (2013.01)

(58) Field of Classification Search
CPC .......... G05B 19/042; G05B 2219/2639; G06Q 50/06; H02J 3/14; H02J 13/00; Y02B 70/3225
See application file for complete search history.

(56) References Cited

U.S. PATENT DOCUMENTS 8,706,650 B2 * 4/2014 Ozog ............... G06Q 10/06
705/412
8,825,215 B2 * 9/2014 Boot ............... G01R 21/1333
700/286

(Continued)

FOREIGN PATENT DOCUMENTS

EP 2811448 A1 12/2014
JP 2013-161144 A 8/2013
(Continued)

OTHER PUBLICATIONS

Office Action dated Feb. 6, 2018 issued in counterpart Japanese Application No. 2016-566333.
(Continued)

*Primary Examiner* — Brian W Wathen
*Assistant Examiner* — Brian T McMenemy
(74) *Attorney, Agent, or Firm* — Procopio Cory Hargreaves and Savitch LLP

(57) ABSTRACT

A server comprises a notification unit that sends a power reduction request to a user terminal of a consumer; and a controller that acquires smart meter information sent from the user terminal when the consumer accepts the power reduction request. The smart meter information is information regarding a smart meter of a consumer facility that is a target for power reduction. The controller determines actual reduced power of the consumer facility based on the smart meter information.

11 Claims, 10 Drawing Sheets

(51) Int. Cl.
*H02J 3/14* (2006.01)
*H02J 13/00* (2006.01)
*G05F 5/00* (2006.01)

(56) References Cited

U.S. PATENT DOCUMENTS

| | | | |
|---|---|---|---|
| 2011/0172841 A1* | 7/2011 | Forbes, Jr. | G01D 4/004 |
| | | | 700/292 |
| 2011/0202467 A1* | 8/2011 | Hilber | G06Q 50/188 |
| | | | 705/80 |
| 2013/0140893 A1* | 6/2013 | Ikeda | G06Q 50/06 |
| | | | 307/35 |
| 2013/0166080 A1* | 6/2013 | Furuta | G05B 15/02 |
| | | | 700/286 |
| 2014/0180968 A1 | 6/2014 | Song et al. | |
| 2014/0277814 A1* | 9/2014 | Hall | H02J 3/14 |
| | | | 700/298 |
| 2015/0134280 A1* | 5/2015 | Narayan | G06Q 10/04 |
| | | | 702/62 |

FOREIGN PATENT DOCUMENTS

| | | | |
|---|---|---|---|
| JP | 2013161144 A | * | 8/2013 |
| JP | 2013-229995 A | | 11/2013 |
| JP | 2014-229000 A | | 12/2014 |

OTHER PUBLICATIONS

International Search Report dated Mar. 15, 2016, issued by Japan Patent Office for International Application No. PCT/JP2015/085634.

Insys Microelectronics GmbH, Smart meters are key elements in rational energy use, Sep. 28, 2011, www.insys-icom.com, 2 pages.

* cited by examiner

SERVER, USER TERMINAL, AND PROGRAM

TECHNICAL FIELD

The present invention relates to a server, a user terminal, and a program used in a power control system.

BACKGROUND ART

In recent years, an energy management system (EMS) for managing an equipment provided in a consumer facility that consumes electric power has been drawing attention.

In addition, a demand response (DR) has been drawing attention as a method of power control. The demand response is "to change a power usage pattern so that the consumer (user) suppresses the use of electric power in response to the request of a power supplier".

In the demand response, in a time period designated by a power reduction request from a power supplier server managed by an electric power company or the like, the energy management system reduces power usage. The consumer can acquire an incentive corresponding to the contribution of the power usage reduction (for example, Patent Literature 1).

For the demand response described above, there is a demand for a method allowing a consumer to appropriately control power usage.

CITATION LIST

Patent Literature

Patent Literature 1: Japanese application publication No. 2013-229995

SUMMARY OF INVENTION

A first aspect is abstracted as a server comprising: a notification unit that sends a power reduction request to a user terminal of a consumer; and a controller that acquires smart meter information sent from the user terminal when the consumer accepts the power reduction request, wherein the smart meter information is information regarding a smart meter of a consumer facility that is a target for power reduction, and the controller determines actual reduced power of the consumer facility based on the smart meter information.

A second aspect is abstracted as a user terminal of a consumer comprising: a controller that acquires smart meter information regarding a smart meter of a consumer facility that is a target for power reduction, when the consumer accepts a power reduction request from a server, wherein the controller notifies the server of the smart meter information.

A third aspect is abstracted as a program causing a user terminal of a consumer to execute: a step of acquiring smart meter information regarding a smart meter of a consumer facility that is a target for power reduction when the consumer accepts a power reduction request from a server; and a step of notifying the server of the smart meter information.

DESCRIPTION OF EMBODIMENTS

Figure 1:
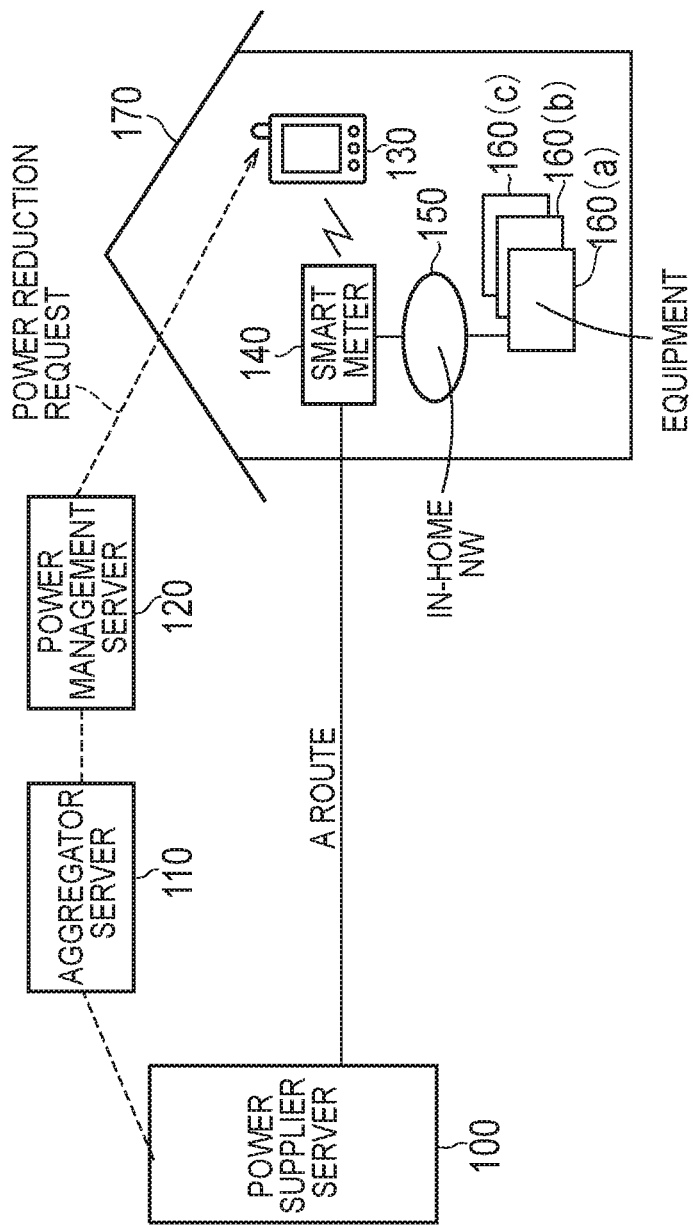
FIG. 1 is a system configuration diagram according to a first embodiment.

Hereinafter, embodiments of the present invention will be described with reference to the accompanying diagrams. In addition, in the following description of the diagrams, the same or similar portions are denoted by the same or similar reference numerals.

1. First Embodiment (1.1 System Configuration)

The system configuration of a first embodiment will be described with reference to FIG. 1.

(1.1.1 Overall Configurations)

FIG. 1 is a system configuration diagram according to the first embodiment.

As illustrated in FIG. 1, a system according to the first embodiment has a power supplier server 100, an aggregator server 110, a power management server (user terminal management server) 120, a user terminal 130, a smart meter 140, an in-home NW 150, and an equipment 160. The smart meter 140, the in-home NW 150, and the equipment 160 are installed in a consumer facility 170.

The consumer facility 170 is a facility that receives a supply of electric power from the power supplier. The consumer facility 170 is, for example, a residence or a building. In the first embodiment, an example in which the consumer facility 170 is a residence will be described.

The power supplier server 100, the aggregator server 110, the power management server 120, and the user terminal 130 are connected to each other through, for example, an external NW. In addition, the power supplier server 100 and the smart meter 140 are also connected to each other through the external NW. The external NW is the Internet, a private network, an exclusive line, or the like.

The smart meter 140 and the equipment 160 are connected to each other through the in-home NW 150. The in-home NW 150 is a cable LAN, a wireless LAN, or the like. The in-home NW 150 is used when the smart meter 140 acquires the power usage of the equipment 160 used in the consumer facility 170. The smart meter 140 and the equipment 160 are connected to the in-home NW 150.

Here, an example of the operation of the system according to the first embodiment will be described.

The power supplier server 100 transmits a power control request message including a power control request time period to the user terminal 130. Here, the "power control request" includes two concepts of a power reduction request for reducing power usage and a power use request for increasing power usage. In the first embodiment, as an example of the power control request, there is a case of a power reduction request for reducing power usage. In addition, as the power use request, for example, a case of requesting each consumer to send the minimum power usage is assumed.

First, the power supplier server 100 transmits a power reduction request message including a power reduction request time period to the user terminal 130. The user terminal 130 acquires power usage from the smart meter 140 in response to the reception of the power reduction request message, and notifies the power supplier server 100 of the acquired power usage as first power usage. The power supplier server 100 acquires power usage from the smart meter 140, as second power usage, in the power reduction request time period, and calculates actual reduced power from the first power usage and the second power usage.

Here, the power reduction request time period is a time period in which the power supplier requests the consumer to reduce power usage. For example, the power supplier designates a time period in which it is expected that the demand for electric power will increase and the amount of power supply will become insufficient, such as the afternoon of midsummer day, as the power reduction request time period.

(1.1.2 Description of each Apparatus)

In order to realize the above-described operation, each apparatus that forms the system according to the first embodiment will be described.

The power supplier server 100 is a server managed by a power supplier, such as an electric company. The power supplier server 100 measures the power usage of the consumer facility 170 from the smart meter 140, and gives a power reduction request to the user terminal 130. In addition, the power supplier server 100 notifies the power management server 120 of the power usage that has been reduced (hereinafter, referred to as "actual reduced power") in the consumer facility 170.

The aggregator server 110 is a server installed by an aggregator that collects electric power used in a predetermined area. The predetermined area is an area where the aggregator provides the service, and areas such as prefectures and municipalities are assumed. In a case where the power supplier server 100 makes a request for power reduction without going through the aggregator server 110, the aggregator server 110 is not required.

It is assumed that the power management server 120 is operated by an operator of a predetermined service facility, such as a corner store or a shopping mall. The power management server 120 manages member information and the like of the consumer that uses the user terminal 130. The power management server 120 has information required to transmit a power reduction request message to the user terminal 130, such as an e-mail address of the user terminal 130.

In addition, the power management server 120 gives an incentive corresponding to the actual reduced power to the user terminal 130. The incentive is, for example, a monetary incentive or a non-monetary incentive. More specifically, the incentive is, for example, a point that can be used in a facility operated by the operator of the power management server 120 or a discount when purchasing an item.

The user terminal 130 notifies the power supplier server 100 of the power usage acquired from the smart meter 140. In addition, the user terminal 130 acquires an incentive or the content of the incentive from the power management server 120. In the first embodiment, the user terminal 130 may be not only a home energy management system (HEMS) terminal installed in the consumer facility 170 but also a terminal capable of communicating with the power management server 120. For example, it is assumed that a terminal carried by a consumer (user), such as a smartphone, a mobile phone, a personal computer, a tablet, or a wearable terminal, is used as the user terminal 130. A case where a consumer carries a terminal is not limited to the time of going out, but also includes a case where a consumer is in the consumer facility. When such a portable terminal is used as the user terminal 130, the user terminal 130 and the power management server 120 communicate with each other using, for example, a public general line.

The smart meter 140 measures the power usage of the equipment 160 connected thereto through the in-home NW 150. In addition, the smart meter 140 sends notification of power usage in response to an inquiry from the power supplier server 100 or the user terminal 130.

The equipment 160 is an electrical equipment used in the consumer facility 170.

(1.1.3 Acquisition Route of Power Usage)

A and B routes are used for acquisition of the power usage of the consumer facility 170.

The A route is a route connecting the power supplier server 100 and the smart meter 140 to each other. The A route is used when transmitting data, such as power usage, from the smart meter 140 to the power supplier server 100.

The B route is a route connecting the smart meter 140 and the HEMS terminal or a building energy management system (BEMS) terminal to each other. In the first embodiment, the user terminal 130 acquires power usage from the smart meter 140 through the B route.

(1.2 Configuration of a User Terminal)

Figure 2:
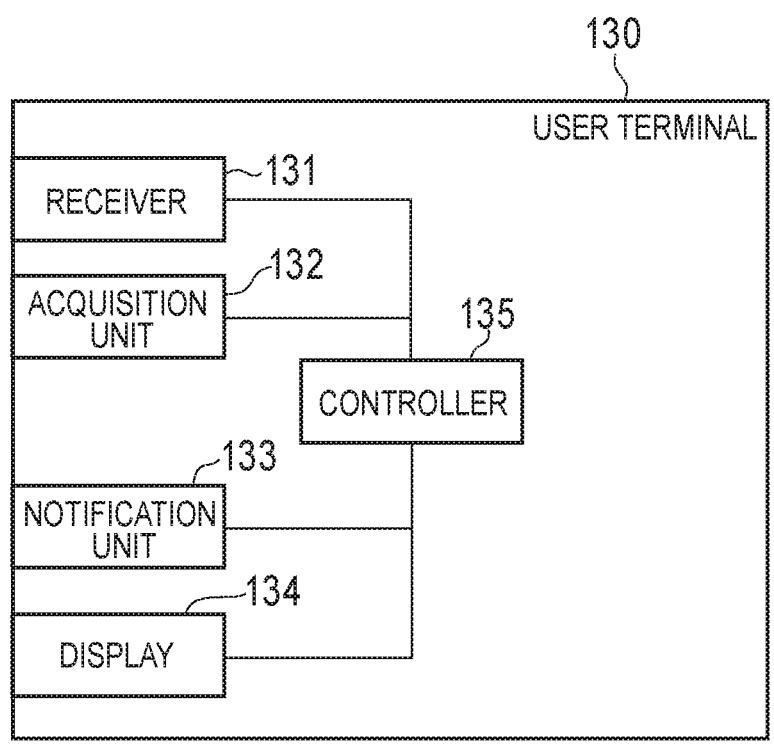
FIG. 2 is a block diagram of a user terminal according to the first embodiment.

The user terminal 130 according to the first embodiment will be described with reference to FIG. 2.

The user terminal 130 has a receiver 131, an acquisition unit 132, a notification unit 133, a display 134, and a controller 135. The receiver 131, the acquisition unit 132, the notification unit 133, and the controller 135 are configured by a CPU or a memory, for example. As examples of the display 134, a TV, a liquid crystal device, a tablet different from the user terminal, and a mobile terminal can be mentioned.

The receiver 131 receives a power reduction request message including a power reduction request time period from the power supplier server 100. The power reduction request message may indicate that, for example, the power reduction request is on the current day (for example, five minutes before the start time) or on the day before power reduction is performed. The power reduction request message is transmitted for notification by e-mail, application, or the like.

The acquisition unit 132 acquires power usage from the smart meter 140 in the consumer facility 170 in response to the reception of the power reduction request message. The acquisition unit 132 may acquire an incentive corresponding to actual reduced power from the power management server 120 that has acquired the actual reduced power.

The notification unit 133 notifies the power supplier server 100 of the power usage acquired by the acquisition unit 132. The notification unit 133 may be configured to notify the power supplier server 100 of the power usage, which is acquired by the acquisition unit 132, through the power management server 120.

The display 134 may be, for example, a liquid crystal display or a touch panel. The display may include various buttons for receiving an operation of a consumer (user).

The controller 135 controls the receiver 131, the acquisition unit 132, the notification unit 133, and the display 134. In a case where the consumer accepts the power reduction request from the server (the power supplier server 100, the aggregator server 110, or the power management server 120), the controller 135 accesses the smart meter 140 of the consumer facility 170 that is a target for power reduction, and performs control to acquire smart meter information regarding the smart meter 140.

For example, when a consumer reduces power usage at home in response to the power reduction request, the controller 135 acquires smart meter information of the smart meter 140 at home. On the other hand, when the consumer reduces the power usage of an outside facility (office or the like) in response to the power reduction request, the controller 135 acquires smart meter information of the smart meter 140 of the outside facility.

The consumer may select whether to reduce the power usage of the outside facility or to reduce the power usage at home. When the consumer goes out, one or both of the power usage of the outside facility and the power usage at home may be reduced. When transmitting the power reduction request to the consumer, the server may include information regarding a facility that desires to reduce power usage to the power reduction request. Specifically, reduction of the power usage of one or both of an outside facility and a home is desired. Alternatively, facilities that desire to reduce power usage are targets for power reduction, may be listed based on the position information of the user terminal 130. As the position information, for example, position information such as an address registered in advance or position information based on a global positioning system (GPS) can be used. As the case where the consumer reduces the power usage of the outside facility, for example, a case of reducing electric power in a facility at work, a case of reducing electric power in an outside facility, and the like are assumed.

The smart meter information includes at least one of the identification information of the smart meter 140 and the power usage measured by the smart meter 140. The identification information of the smart meter 140 is any information by which the smart meter 140 can be identified. For example, the identification information of the smart meter 140 may be an identifier (SM-ID) of the smart meter 140 or the address (IP address or the like) of the smart meter 140. The controller 135 notifies a server (the power supplier server 100, the aggregator server 110, or the power management server 120) of the smart meter information. When the server directly accesses the smart meter 140 to measure the power usage, only the identification information of the smart meter 140 is transmitted to the server as smart meter information.

In addition, when the power usage of the consumer facility 170 is reduced in response to the power reduction request, the controller 135 performs control to acquire an incentive corresponding to the actual reduced power of the consumer facility 170.

In a case where the consumer accepts the power reduction request, the scheduled reduction amount of power usage may be transmitted when transmitting the smart meter information to the server. The scheduled reduction amount may be, for example, electric power (OO kW) or a reduction ratio (OO %) with respect to the current power usage. In addition, the scheduled reduction amount is not limited to being transmitted when transmitting the smart meter information to the server, and may be transmitted separately after transmitting the smart meter information to the server.

(1.3 Configuration of a Power Management Server)

Figure 3:
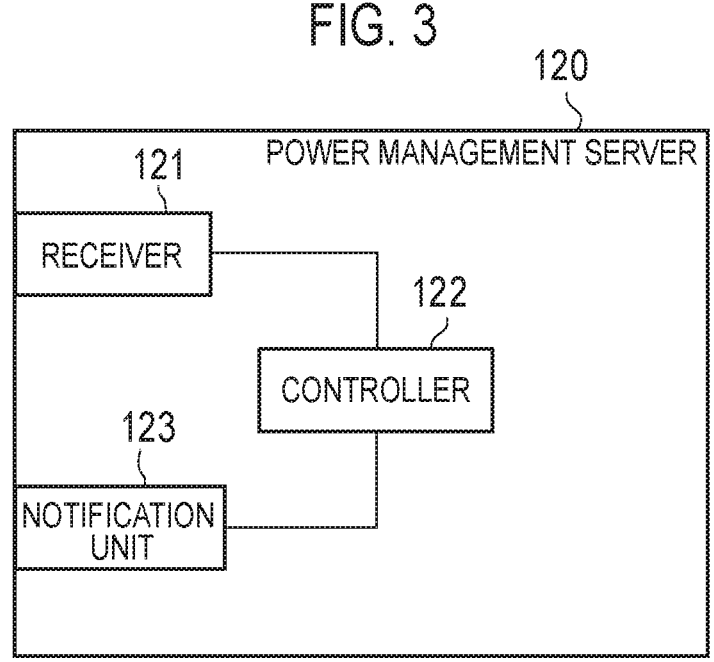
FIG. 3 is a block diagram of a power management server according to the first embodiment.

The power management server 120 according to the first embodiment will be described with reference to FIG. 3.

The power management server 120 has a receiver 121, a notification unit 123, and a controller 122. The receiver 121, the notification unit 123, and the controller 122 are configured by a CPU or a memory, for example.

In response to the reception of the power reduction request message from the power supplier server 100 by the user terminal 130, the receiver 121 receives the power usage (smart meter information) of the consumer facility 170, which has been acquired from the smart meter 140 in the consumer facility 170, from the user terminal 130.

In addition, the receiver 121 may acquire the actual reduced power, which is a difference between power usage and power usage in the power reduction request time period, from the power supplier server 100.

The notification unit 123 notifies the power supplier server 100 of the power usage (smart meter information).

In addition, the notification unit 123 may notify the user terminal 130 of the incentive corresponding to the actual reduced power.

The controller 122 controls the receiver 121 and the notification unit 123.

(1.4 Configuration of a Power Supplier Server)

Figure 4:
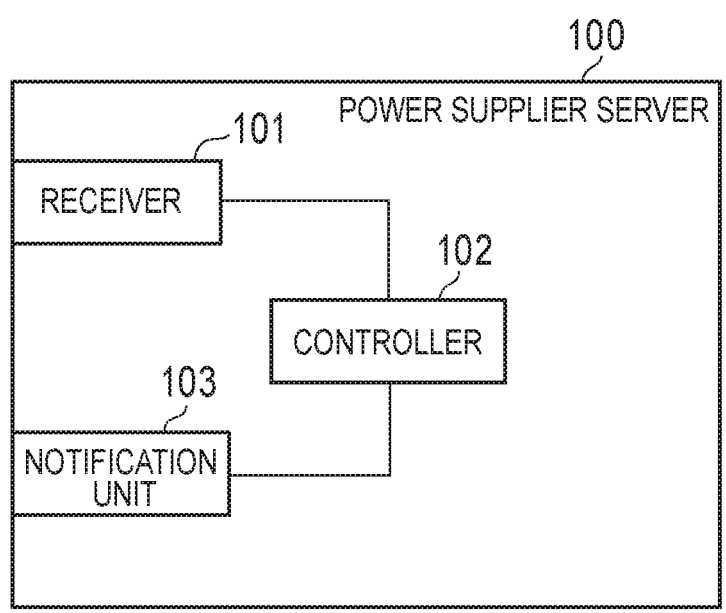
FIG. 4 is a block diagram of a power supplier server according to the first embodiment.

The power supplier server 100 according to the first embodiment will be described with reference to FIG. 4.

The power supplier server 100 has a receiver 101, a notification unit 103, and a controller 102. The receiver 101, the notification unit 103, and the controller 102 are configured by a CPU or a memory, for example.

The notification unit 103 sends notification of a power reduction request to the user terminal 130 of the consumer facility through the power management server 120.

In a case where the consumer accepts the power reduction request, the receiver 101 receives the smart meter information, which is sent from the user terminal 130, through the power management server 120.

The controller 102 acquires the smart meter information, accesses the smart meter 140 to determine the actual reduced power of the consumer facility 170 based on the smart meter information.

The controller 102 calculates the actual reduced power from the power usage (first power usage) sent from the user terminal 130 and the power usage (second power usage) acquired from the smart meter 140. Alternatively, the controller 102 may calculate the actual reduced power only from the power usage acquired from the smart meter 140. In this case, the controller 102 may not acquire the power usage (first power usage) from the user terminal 130.

In addition, when the power usage of the consumer facility 170 is reduced in response to the power reduction request, the controller 102 performs processing for giving an incentive corresponding to the actual reduced power to the consumer. For example, the controller 102 notifies the power management server 120 of the actual reduced power in order to give an incentive to the consumer.

In the first embodiment, an example is described in which the power supplier server 100 determines the actual reduced power. However, the actual reduced power may be determined by the aggregator server 110. In this case, the operation of the power supplier server 100 may be performed by the aggregator server 110 instead of the power supplier server 100.

(1.5 Operation Example 1)

Operation Example 1 according to the first embodiment will be described with respect to FIG. 5. In addition, although the aggregator server 110 is omitted in the following description, a message transmitted and received between the power supplier server 100 and the aggregator server 110 may be transmitted and received through the aggregator server 110.

In step S400, the user terminal 130 transmits a "power reduction request message reception" registration request to the power management server 120. The "power reduction request message reception" registration request is that the user terminal 130 is requested to register the information of the user terminal 130 and the information of the smart meter 140 in the power management server 120. The information of the user terminal 130 is an address of the user terminal 130, for example, an e-mail address. In addition, the information of the smart meter 140 is an SM-ID or the like that is an identifier of the smart meter 140.

Once registered in the power management server 120 in step S400, the power reduction request is transmitted. After registering the home of the consumer facility, an outside facility may be additionally registered. When a power reduction request for the consumer facility is received in a state where the consumer facility is registered as a home, an outside facility may be additionally registered. At that time, the smart meter information of the outside facility is acquired when receiving the power reduction request, and the acquired smart meter information is transmitted to the power management server 120.

Once the smart meter information (SM-ID) is registered in the power management server 120, the consumer facility may only select the power usage of which facility is to be reduced without transmitting the smart meter information when the power reduction request is received. Accordingly, the power management server 120 can specify the smart meter 140 matched with the selected facility.

When the "power reduction request message reception" registration request is received, the power management server 120 performs registration as the user terminal 130 of the "power reduction request message reception" target.

In step S401, the power supplier server 100 transmits a power reduction request message to the power management server 120. The power reduction request message includes information indicating the power reduction request time period.

In step S402, when the power reduction request message is received from the power supplier server 100, the power management server 120 transmits the power reduction request message to the registered user terminal 130. The power reduction request message may be transmitted by e-mail. The user terminal 130 that has received the power reduction request message performs display according to the power reduction request.

In step S403, when the consumer (user) consents to the power reduction request, the user terminal 130 gives an inquiry on the power usage to the smart meter 140. The inquiry on the power usage may also be given using the B route.

In step S404, the smart meter 140 transmits a response to the power usage inquiry to the user terminal 130. The response includes smart meter information. The smart meter information includes the SM-ID and the current power usage (for example, XXX kw).

In step S405, the user terminal 130 transmits a response (power reduction response), which indicates that the power reduction request is accepted, to the power management server 120. The response includes smart meter information (SM-ID and power usage).

For example, the user terminal 130 may transmit a response by accessing the URL described in the power reduction request message received by e-mail. Alternatively, the user terminal 130 may transmit a response using a dedicated application.

In step S406, the power management server 120 transmits the response, which has been received from the user terminal 130, to the power supplier server 100. The response includes smart meter information (SM-ID and power usage).

Next, an operation in the power reduction request time period will be described.

In step S407, the power supplier server 100 acquires power usage from the smart meter 140. When acquiring the power usage, the smart meter 140 is specified based on the SM-ID. The acquisition of power usage in step S407 may be performed using the A route.

In step S408, the smart meter 140 transmits a response to the power supplier server 100. The response includes the SM-ID and the current power usage, that is, power usage (for example, YYY kw) in the power reduction request time period. Alternatively, the response may include a history of power usage (for example, power usage every 30 minutes) in a past certain period.

The power supplier server 100 calculates actual reduced power when the response is received in step S408. The actual reduced power is a difference between the power usage when the power reduction request message is received and the power usage in the power reduction request time period. In the example illustrated in FIG. 5, the actual reduced power is XXX-YYY kw. Alternatively, the power supplier server 100 may calculate a difference between the power usage before the power reduction request time period and the power usage in the power reduction request time period, as actual reduced power, based on the history of power usage in a past certain period.

In step S409, the power supplier server 100 notifies the power management server 120 of the actual reduced power. The notification of actual reduced power includes the SM-ID and the actual reduced power (XXX-YYY kw).

When the actual reduced power notification is received from the power supplier server 100, the power management server 120 calculates an incentive to be given to the user terminal 130 based on the actual reduced power.

In step S410, the power management server 120 gives the incentive to the user terminal 130.

(1.6 Operation Example 2)

Operation Example 2 according to the first embodiment will be described with respect to FIG. 6. Explanation of portions in common with Operation Example 1 will be omitted, and operations specific to Operation Example 2 will be described.

In Operation Example 2, the user terminal 130 registers "power reduction request message reception" in the power supplier server 100.

In step S500, the user terminal 130 transmits a "power reduction request message reception" registration request to the power management server 120. Information included in the "power reduction request message reception" registration request is the same as in Operation Example 1.

In step S501, the power management server 120 transmits the "power reduction request message reception" registration request, which has been received from the user terminal 130, to the power supplier server 100.

Therefore, the power supplier server 100 can transmit the power reduction request message directly to the user terminal 130.

In step S502, the power supplier server 100 transmits a power reduction request message to the user terminal 130.

Steps S503 and S504 are the same as steps S403 and S404.

In step S505, the user terminal 130 transmits a response to the power supplier server 100. The response includes the SMID and the power usage (XXX kw) acquired from the smart meter 140.

Steps S506 to S509 are the same as steps S407 to S410.

(1.7 Display Screen of a User Terminal)

The display screen of the user terminal 130 will be described with reference to FIG. 7.

Figure 7:
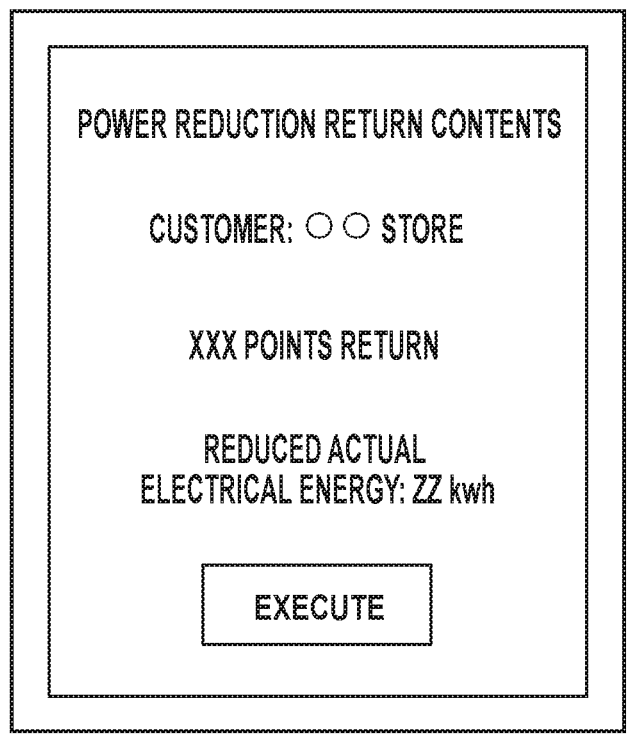
FIG. 7 is a diagram illustrating a display screen of a user terminal.

FIG. 7 is a diagram illustrating an example of the display screen of the display 134 when the incentive from the power management server 120 is given to the user terminal 130.

An example is shown in which "OO store" registered as a member by the user terminal 130 operates the power management server 120.

The actual reduced power (here, reduced actual electrical energy=ZZ kWh) and points to be returned (XXX points) or a discount amount when purchasing an item are displayed on the screen of the user terminal 130.

(1.8 Summary of the First Embodiment)

A power control method according to the first embodiment is a power control method for controlling the power usage of the consumer facility 170 in response to a request from the power supplier server 100, and includes: a step in which the power supplier server 100 transmits a power reduction request message including a power reduction request time period to the user terminal 130 of the consumer facility 170; a step in which the user terminal 130 acquires power usage from the smart meter 140 in the consumer facility 170 in response to the reception of the power reduction request message and notifies the power supplier server 100 of the power usage as first power usage; a step in which the power supplier server 100 acquires power usage from the smart meter 140, as second power usage, in the power reduction request time period; and a step in which the power supplier server 100 calculates actual reduced power from the first power usage and the second power usage.

The user terminal 130 according to the first embodiment is the user terminal 130 of the consumer facility 170 used when controlling the power usage of the consumer facility 170 in response to a request from the power supplier server 100, and has: the receiver 131 that receives a power reduction request message, which includes a power reduction request time period, from the power supplier server 100; the acquisition unit 132 that acquires power usage from the smart meter 140 in the consumer facility 170 in response to the reception of the power reduction request message; and the notification unit 133 that notifies the power supplier server 100 of the acquired power usage.

In addition, the power management server 120 according to the first embodiment manages the user terminal 130 of the consumer facility 170, which is used when controlling the power usage of the consumer facility 170, in response to a request from the power supplier server 100. The power management server 120 according to the first embodiment has: the receiver 121 that receives the power usage of the consumer facility 170, which has been acquired from the smart meter 140 in the consumer facility 170, from the user terminal 130 in response to the reception of the power reduction request message including the power reduction request time period from the power supplier server 100 by the user terminal 130; and the notification unit 123 that notifies the power supplier server 100 of the power usage.

As described above, according to the first embodiment, a user having the user terminal 130 capable of acquiring the power usage from the smart meter 140 can respond to the power reduction request. Here, in addition to being able to acquire the power usage from the smart meter 140, the user terminal 130 may receive a power reduction request message and send the power usage to the power supplier server 100 or the like. The user terminal 130 may be a mobile phone or a smartphone. As a result, it is possible to increase the number of target users. Therefore, it can be expected that the effect of power reduction will be increased.

In addition, when the user terminal 130 is a mobile phone or a smartphone, it is possible to receive a power reduction request message even in the outside facility. Therefore, it is possible to increase the amount of reduction of the power usage in the power reduction request time period.

Since incentives are given to the user terminal 130 by contributing to the reduction of power usage, it can also be expected that the effect of power reduction will be further increased.

2. Second Embodiment

Figure 8:
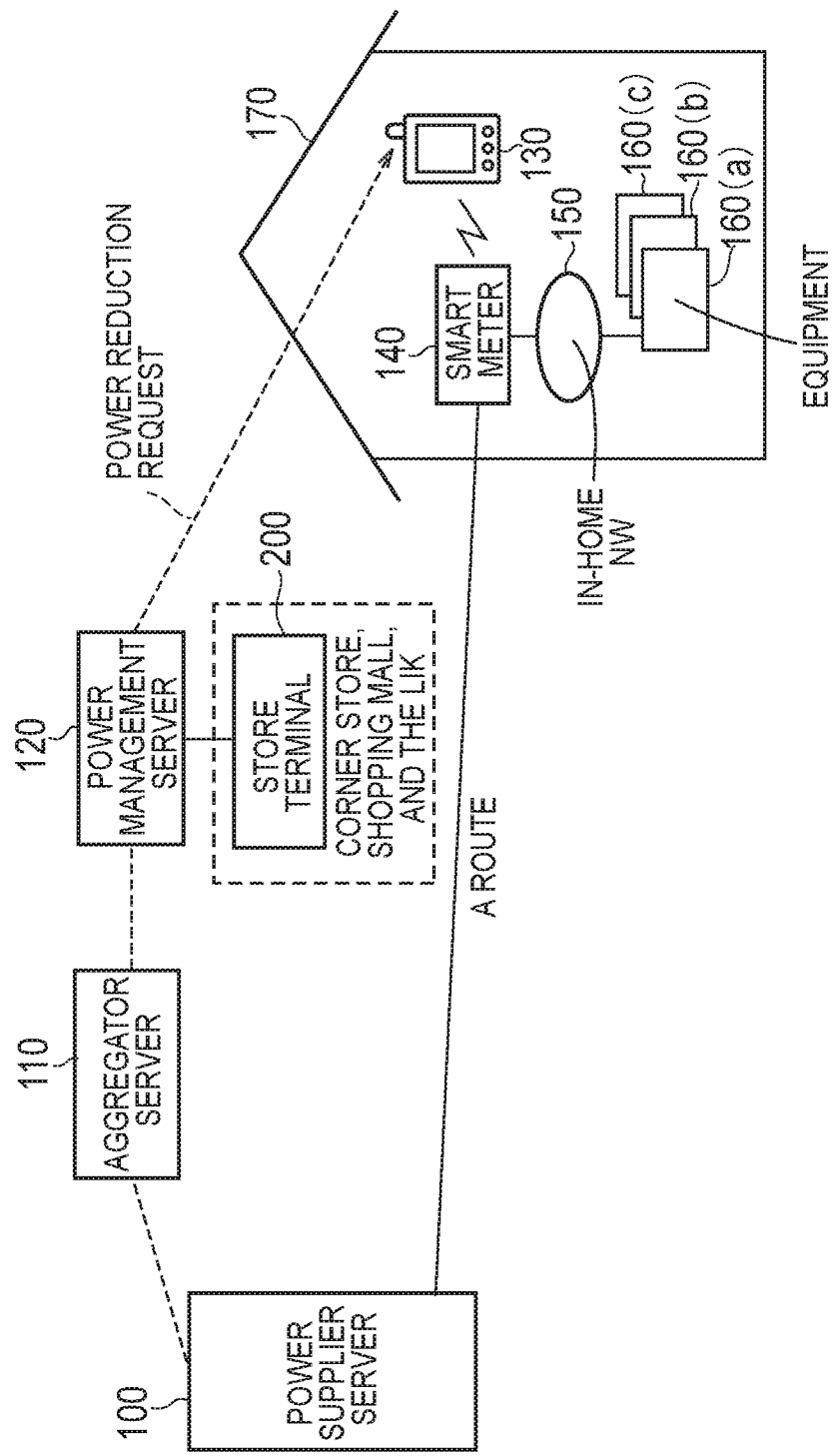
FIG. 8 is a system configuration diagram according to a second embodiment.

A power control method according to a second embodiment will be described with reference to FIGS. 8 and 9. Explanation of portions in common with the first embodiment will be omitted, and portions relevant to the second embodiment will be mainly described.

(2.1 System Configuration)

A system configuration according to the second embodiment will be described with reference to FIG. 8.

The second embodiment is different from the first embodiment in that a store terminal (incentive granting terminal) 200 is installed in a store (predetermined service facility), such as a corner store or a shopping mall. Other configurations are the same as in the first embodiment.

The power management server 120 is operated by an operator of a predetermined service facility, such as a corner store or a shopping mall, and the store terminal 200 is installed in a facility (store) of the operator. In addition, the store terminal 200 is operated by the same operator as the power management server 120.

The power management server 120 acquires smart meter information from the user terminal 130 through the store terminal 200 in the power reduction request time period, and gives an incentive to the user terminal 130 (consumer) through the store terminal 200.

The store terminal 200 acquires an incentive to be given to the user terminal 130 from the power management server 120. In addition, the store terminal 200 gives an incentive to the user terminal 130 in response to a request of the user terminal 130. The store terminal 200 communicates with the user terminal 130 by cable communication or radio communication, such as near field communication (NFC).

(2.2 Operation Example)

An operation example according to the second embodiment will be described with reference to FIG. 9.

Figure 5:
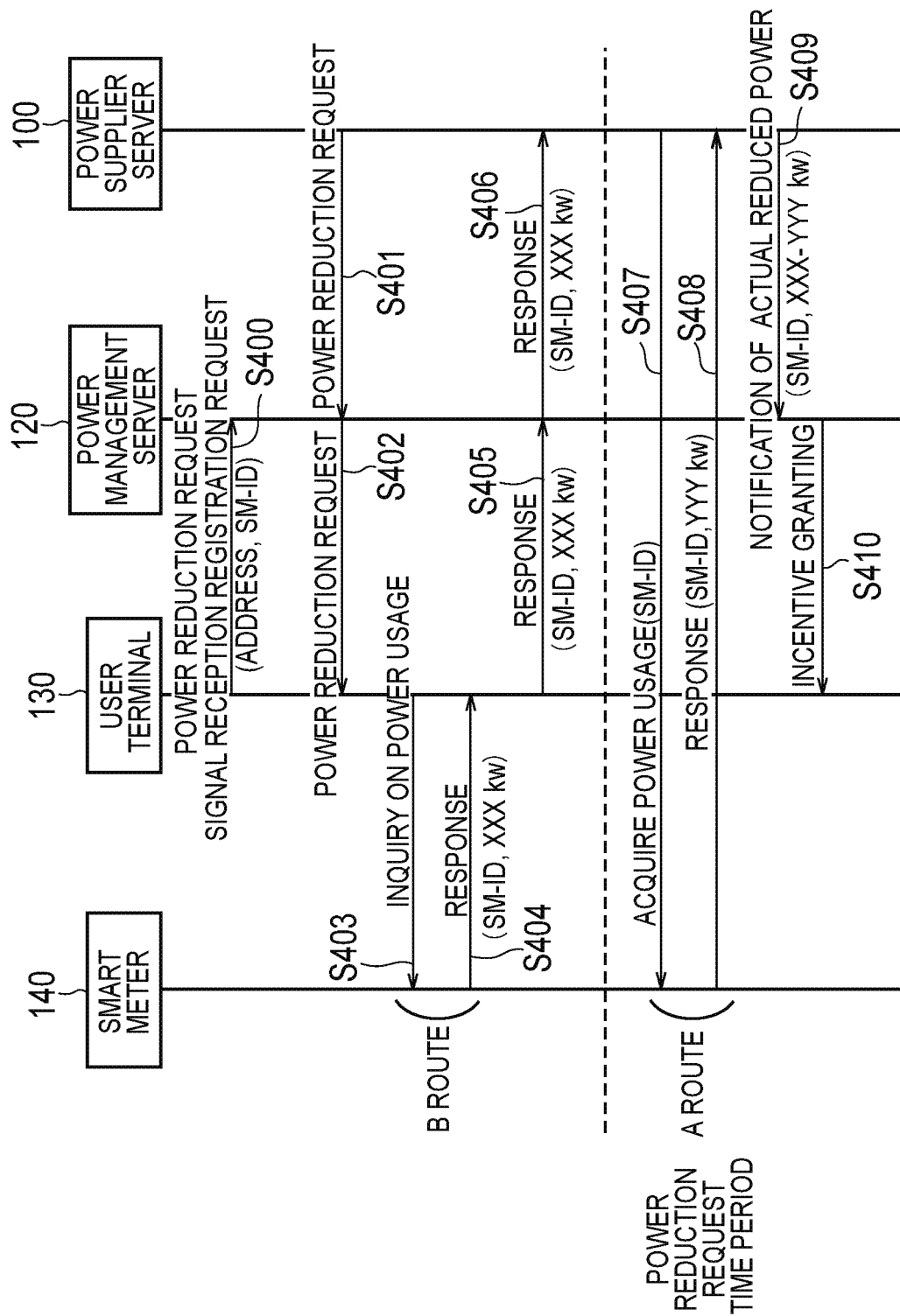
FIG. 5 is a sequence diagram according to the first embodiment (Operation Example 1).
Figure 9:
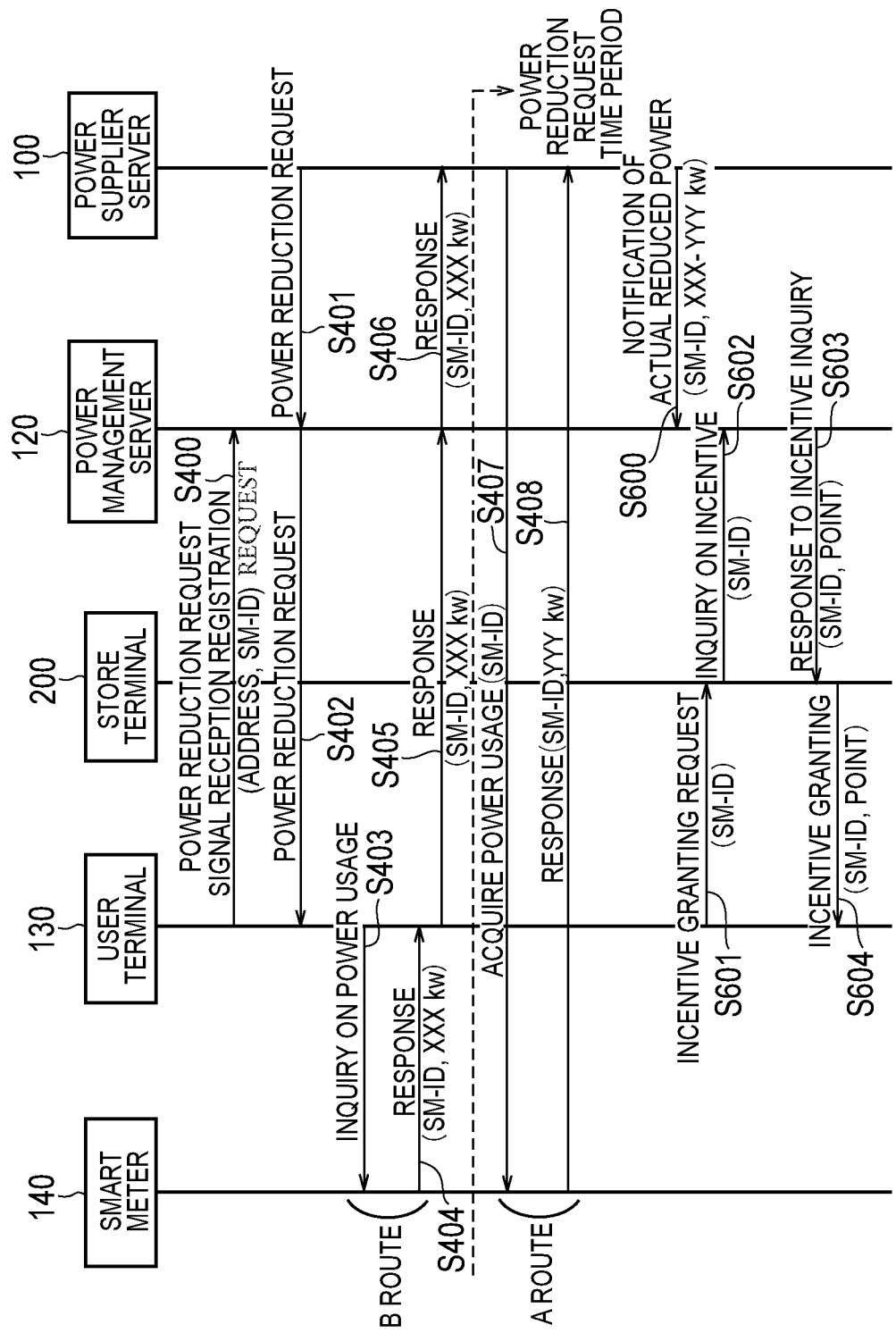
FIG. 9 is a sequence diagram according to the second embodiment.

The procedure of steps S400 to S408 in FIG. 9 is the same as the procedure of steps S400 to S408 in FIG. 5. The method of giving an incentive to the user terminal 130 is different from that of the first embodiment. In addition, in the second embodiment, the user terminal 130 may not notify the power management server 120 of the smart meter information in step S405. That is, in step S405, the user terminal 130 may notify the power management server 120 of responding to the power reduction request.

In the second embodiment, in order to acquire the incentive, the user who accepts the power reduction request visits a facility (store) where the store terminal 200 is installed with the user terminal 130.

In step S600, the power supplier server 100 transmits a actual reduced power notification to the power management server 120. The actual reduced power notification includes the SM-ID and the actual reduced power (XXX-YYY kw).

The power management server 120 calculates an incentive to be given to the user terminal 130 (consumer) from the actual reduced power.

In step S601, the user terminal 130 transmits an incentive granting request to the store terminal 200. The incentive granting request includes smart meter information (SM-ID).

In step S602, the store terminal 200 inquires of the power management server 120 about the incentive for the SM-ID for which the incentive granting request has been received.

In step S603, the power management server 120 that has received the inquiry about incentive granting transmits an incentive inquiry response to the store terminal 200. The incentive inquiry response includes the SM-ID and the incentive (for example, the number of points) to be given.

In step S604, the store terminal 200 gives an incentive, such as the number of points, to the user terminal 130.

Figure 6:
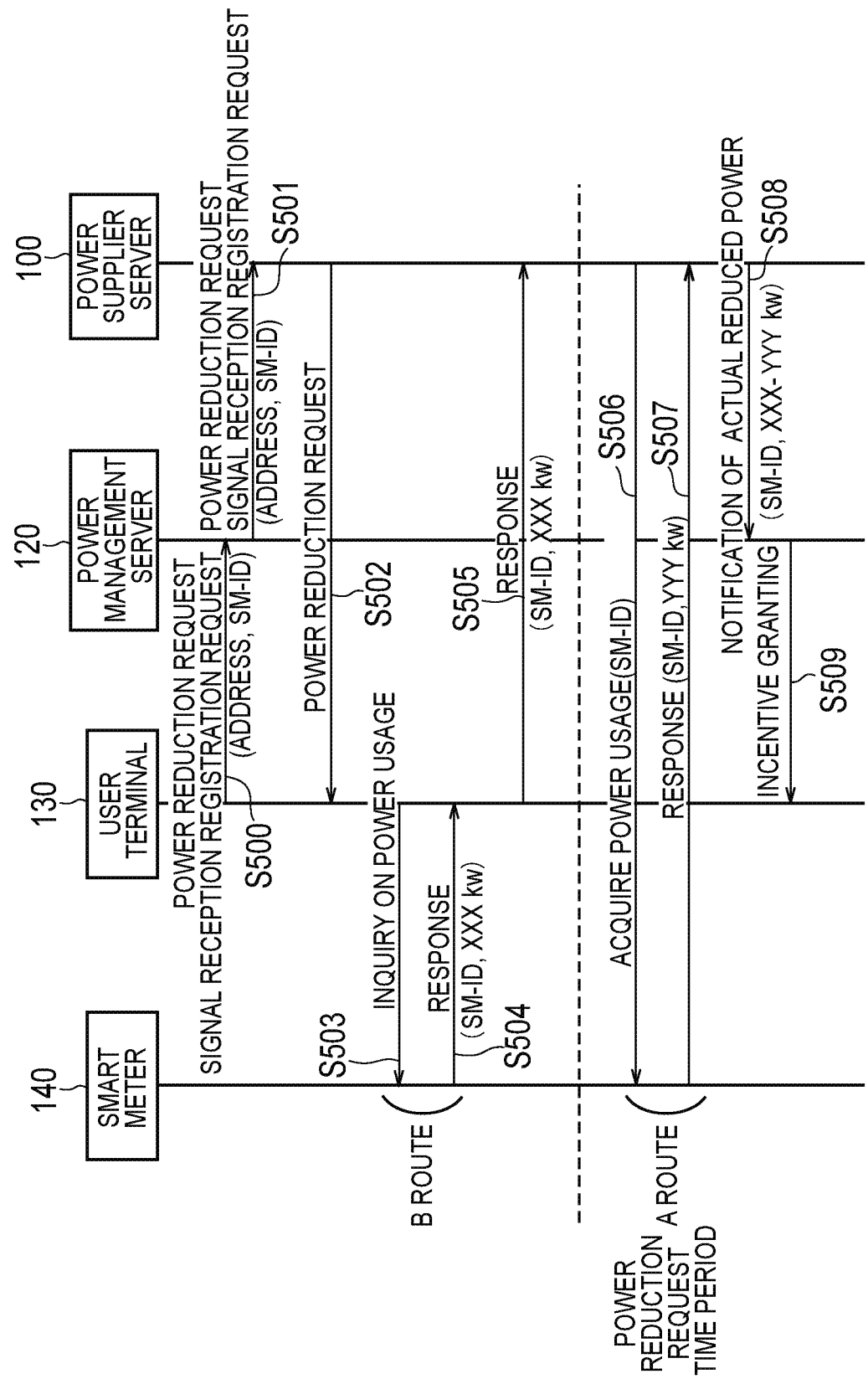
FIG. 6 is a sequence diagram according to the first embodiment (Operation Example 2).

In addition, it is needless to say that the same incentive granting method can be realized even if the operation of steps S400 to S408 in FIG. 9 is replaced with steps S500 to S507 in FIG. 6.

(2.3 Summary of the Second Embodiment)

In the second embodiment, the store terminal 200 is installed in a predetermined service facility operated by the operator of the power management server 120.

The predetermined service facility operated by the operator of the power management server 120 is assumed to be a corner store, a shopping mall, or the like.

By installing the store terminal 200 in a predetermined service facility, users visit the facility in order to acquire points. There is an advantage that the operator of the power management server 120 (operator of a predetermined service facility) can expect the consumer attracting effect. In addition, this is an incentive to encourage consumers to reduce power usage.

3. Third Embodiment

Figure 10:
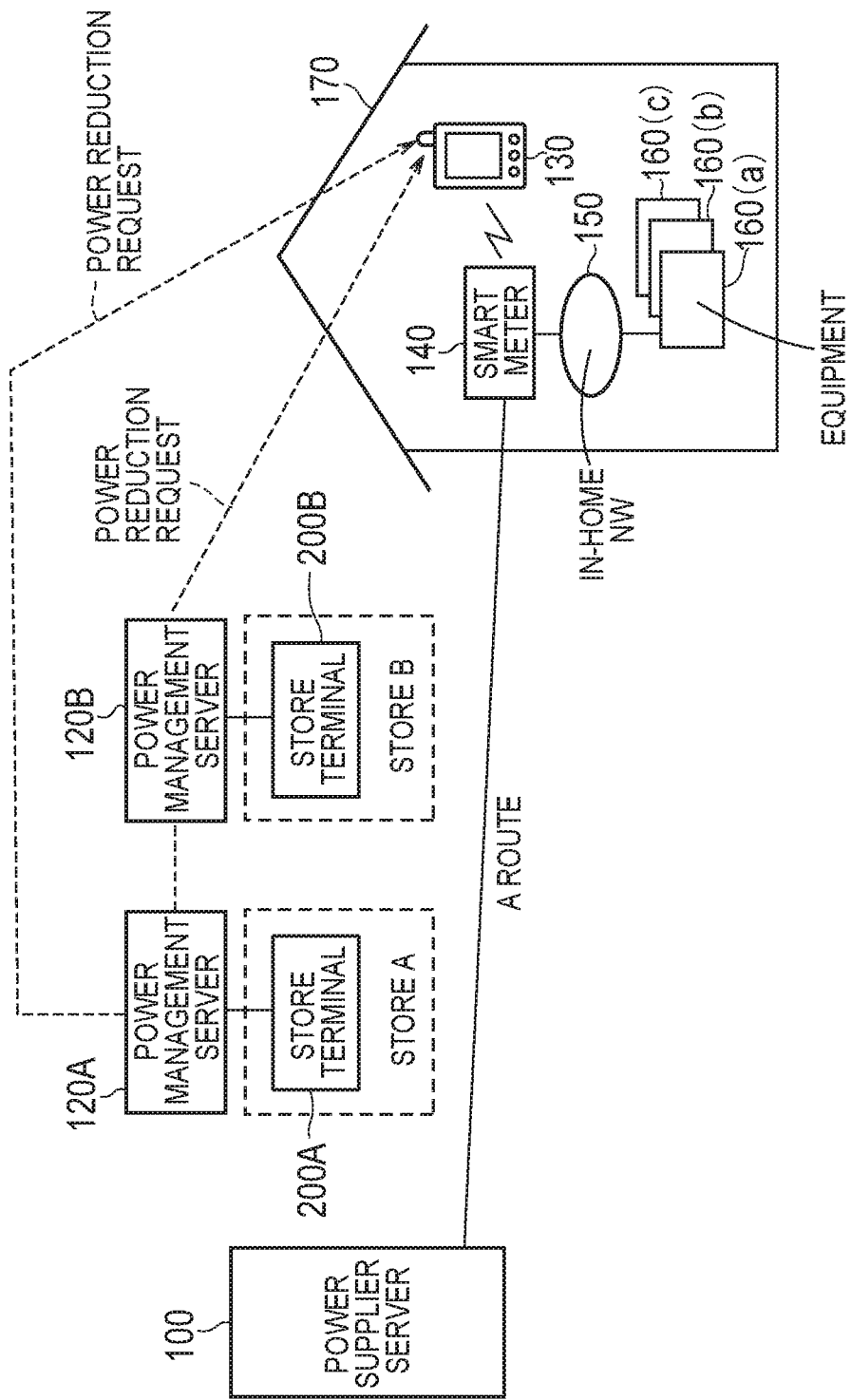
FIG. 10 is a system configuration diagram according to a third embodiment.
Figure 11:
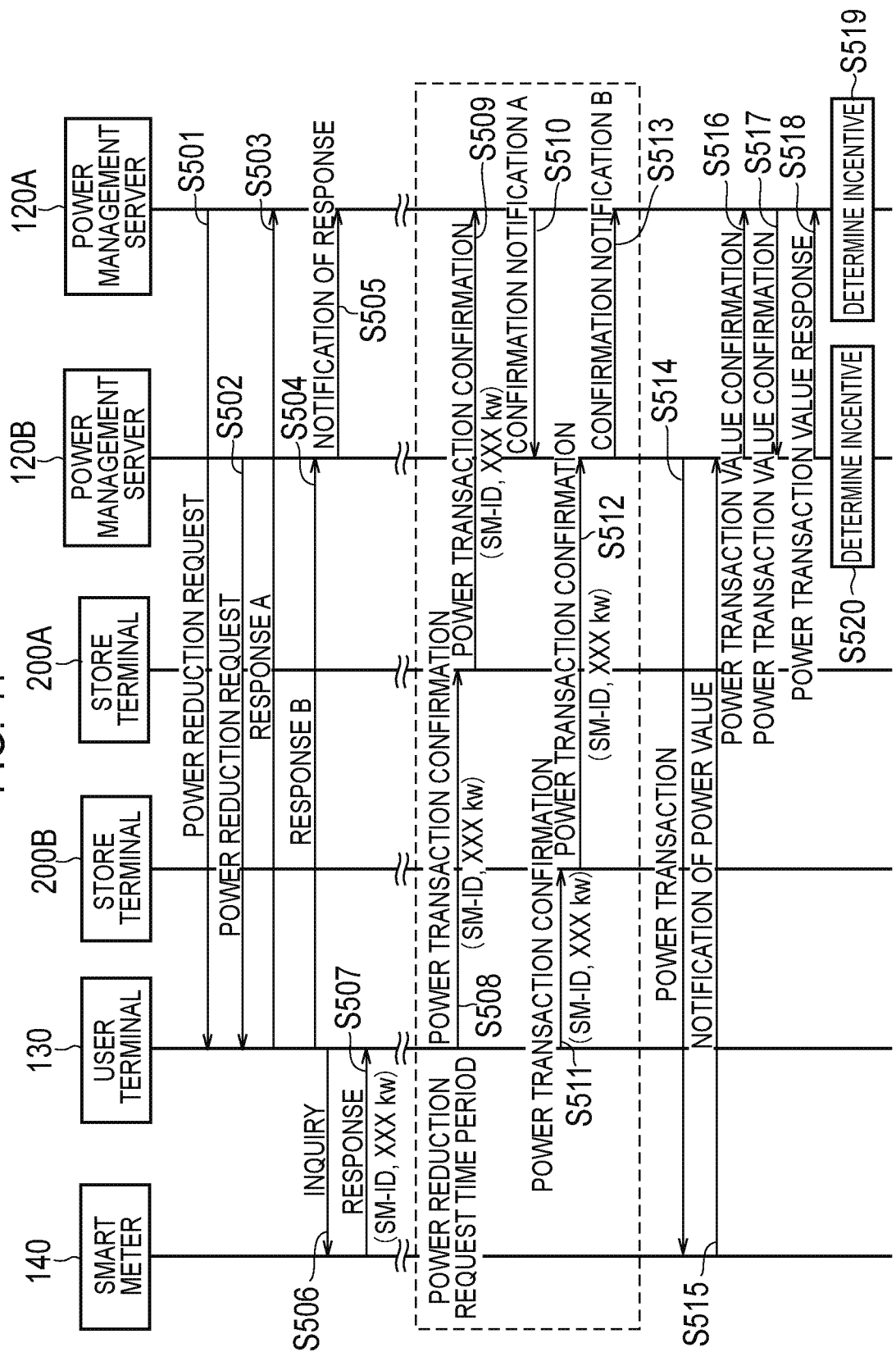
FIG. 11 is a sequence diagram according to the third embodiment.

A power control method according to a third embodiment will be described with reference to FIGS. 10 and 11. Explanation of portions in common with the first and second embodiments will be omitted, and portions relevant to the third embodiment will be mainly described.

(3.1 System Configuration)

A system configuration according to the third embodiment will be described with reference to FIG. 10.

In the third embodiment, a store terminal 200A is installed in a store A, and a store terminal 200B is installed in a store B. A power management server 120A and the store terminal 200A are operated by the operator of the store A. A power management server 120B and the store terminal 200B are operated by the operator of the store B.

Each of the power management server 120A and the power management server 120B transmits a power reduction request message to the user terminal 130 according to the power reduction request message from the power supplier server 100 (or the aggregator server 110).

When the user terminal 130 (consumer) accepts the power reduction request from the power management server 120A and the power management server 120B, the power management server 120A distributes an incentive to be given to the user terminal 130 by communicating with the power management server 120B. For example, the power management server 120A distributes an incentive, which is to be given to the user terminal 130 (consumer), based on the amount of money used in each store by the user terminal 130 (consumer) or the time during which the user terminal 130 (consumer) has stayed in each store.

(3.2 Operation Example)

An operation example according to the third embodiment will be described with reference to FIG. 11.

In step S501, the power management server 120A transmits a power reduction request message to the user terminal 130 according to the power reduction request message from the power supplier server 100. The power reduction request message includes information indicating the power reduction request time period (for example, today's 13:00 to 15:00).

In step S502, the power management server 120B transmits a power reduction request message to the user terminal 130 according to the power reduction request message from the power supplier server 100. The power reduction request message includes information indicating the power reduction request time period (for example, today's 13:00 to 15:00).

The user terminal 130 performs display according to a plurality of power reduction requests to prompt the consumer to determine whether or not to respond to the plurality of power reduction requests. Here, the explanation will be continued on the assumption that the consumer determines to respond to the plurality of power reduction requests and the consumer performs an operation to respond to the plurality of power reduction requests on the user terminal 130.

In step S503, the user terminal 130 transmits a response A, which indicates that the power reduction request is accepted, to the power management server 120A. When notification of the power reduction request is sent by e-mail, the user terminal 130 gives the response A through a Web browser with the URL described in or attached to the e-mail. Alternatively, the user terminal 130 may give the response A using a dedicated application.

In step S504, the user terminal 130 transmits a response B, which indicates that the power reduction request is accepted, to the power management server 120B. Here, the user terminal 130 makes information, which indicates the power management server 120 to which the response has been given, be included in the response B. That is, the user terminal 130 makes information, which indicates that the response A is given to the power management server 120A, be included in the response B.

In step S505, the power management server 120B confirms that the user terminal 130 accepts the power management server 120A based on the response B from the user terminal 130, and transmits a response notification indicating that there has been the response B to the power management server 120A.

On the other hand, in step S506, the user terminal 130 gives an inquiry on the power usage to the smart meter 140. The inquiry on the power usage may also be given using the B route.

In step S507, the smart meter 140 transmits a response to the power usage inquiry to the user terminal 130. The response includes smart meter information. The smart meter information includes the SM-ID and the current power usage (for example, XXX kw).

The operation of the following steps S508 to S513 is performed in the power reduction request time period. Here, a case is assumed in which a consumer visits the stores A and B in order after reducing power usage in the consumer facility 170 in the power reduction request time period.

In step S508, the user terminal 130 accesses the store terminal 200A of the store A, and transmits a power transaction confirmation message, which indicates that incentive transactions are to be performed, to the store terminal 200A. The power transaction confirmation message includes smart meter information. The user terminal 130 may display a display screen, such as that illustrated in FIG. 7, in response to accessing the store terminal 200A.

In step S509, the store terminal 200A transmits a power transaction confirmation message to the power management server 120A. The power management server 120A confirms that the user terminal 130 (consumer) has visited the store A based on the power transaction confirmation message.

In step S510, the power management server 120A transmits a confirmation notification A, which indicates that the user terminal 130 (consumer) has visited the store A, to the power management server 120B. The power management server 120B confirms that the user terminal 130 (consumer) has visited the store A based on the confirmation notification A.

In step S511, the user terminal 130 accesses the store terminal 200B of the store B, and transmits a power transaction confirmation message, which indicates that incentive transactions are to be performed, to the store terminal 200B. The power transaction confirmation message includes smart meter information. The user terminal 130 may display a display screen, such as that illustrated in FIG. 7, in response to accessing the store terminal 200B.

In step S512, the store terminal 200B transmits a power transaction confirmation message to the power management server 120B. The power management server 120B confirms that the user terminal 130 (consumer) has visited the store B based on the power transaction confirmation message.

In step S513, the power management server 120B transmits a confirmation notification B, which indicates that the user terminal 130 (consumer) has visited the store B, to the power management server 120A. The power management server 120A confirms that the user terminal 130 (consumer) has visited the store B based on the confirmation notification B.

After the passage of the power reduction request time period, in step S514, the power management server 120B accesses the smart meter 140 based on the smart meter information. The power management server 120B may directly access the smart meter 140. Alternatively, the power management server 120B may access the smart meter 140 through an electric power company (C route). Alternatively, the power management server 120B may access the smart meter 140 through the HEMS in the consumer facility 170.

In step S515, the smart meter 140 transmits a power value notification, which includes a history of power usage (for example, power usage every 30 minutes) in a past certain period, to the power management server 120B. Alternatively, the smart meter 140 transmits a power value notification, which includes the information of power usage in the power reduction request time period, to the power management server 120B.

The power management server 120B calculates a difference between the power usage before the power reduction request time period and the power usage in the power reduction request time period, as actual reduced power, based on the history of the power usage acquired from the smart meter 140. Alternatively, the power management server 120B may calculate a difference between the power usage before the power reduction request time period acquired in step S512 and the power usage in the power reduction request time period acquired in step S515 as the actual reduced power.

In step S516, the power management server 120B transmits a power transaction value confirmation message to the power management server 120A. The power transaction value confirmation message includes information of the actual reduced power and information of the amount of contribution (contribution amount information B) in the store B of the consumer. The contribution amount information B is the amount of money used in the store B by the consumer or the time during which the consumer has stayed in the store B. The contribution amount information B may also include the frequency at which the consumer visits the store B. The power management server 120B acquires the contribution amount information B from, for example, the store terminal 200B, and makes the contribution amount information B be included in the power transaction value confirmation message.

In step S517, the power management server 120A transmits a power transaction value confirmation message to the power management server 120B. The power transaction value confirmation message includes information of the amount of contribution (contribution amount information A) in the store A of the consumer. The contribution amount information A is the amount of money used in the store A by the consumer or the time during which the consumer has stayed in the store A. The contribution amount information A may also include the frequency at which the consumer visits the store A. The power management server 120A acquires the contribution amount information A from, for example, the store terminal 200A, and makes the contribution amount information A be included in the power transaction value confirmation message.

The power management server 120B distributes an incentive to be given to the consumer based on the contribution amount information A and the contribution amount information B. For example, the actual reduced power is divided according to the ratio between the contribution amount information A and the contribution amount information B to derive actual reduced power A due to the contribution of the store A and actual reduced power B due to the contribution of the store B. From the viewpoint of the consumer, the incentive corresponding to the actual reduced power is divided into an incentive corresponding to the store A and an incentive corresponding to the store B. Incentives are given by points, for example.

In step S518, the power management server 120B transmits a power transaction value response message to the power management server 120A. The power transaction value response message includes the actual reduced power A due to the contribution of the store A. The power transaction value response message includes the actual reduced power B due to the contribution of the store B.

In step S519, the power management server 120A determines the incentive for the consumer based on the actual reduced power A due to the contribution of the store A.

In step S520, the power management server 120B determines the incentive for the consumer based on the actual reduced power B due to the contribution of the store B.

In the third embodiment, an example has been described in which the user terminal 130 receives power transaction request messages from the two power management servers 120. However, the user terminal 130 may receive power transaction request messages from the three or more power management servers 120.

(3.3 Summary of the Third Embodiment)

In the third embodiment, when the user terminal 130 (consumer) accepts the power reduction request from the power management server 120A and the power management server 120B, the power management server 120A distributes an incentive to be given to the user terminal 130 (consumer) by communicating with the power management server 120B. Therefore, even when a consumer accepts a plurality of power reduction requests, it is possible to appropriately give an incentive to the consumer.

4. Other Embodiments

In the embodiments described above, the case of transmitting the power reduction request message from the power supplier server 100 installed by the power supplier has been described. However, the transmission source of the power reduction request message may be the aggregator server 110 installed by the aggregator.

It should be noted that the power management server 120 can appropriately adjust the timing or the number of times that the power management server 120 that has received the power reduction request message transmits the power reduction request message to the user terminal 130. The power management server 120 transmits the power reduction request message to the user terminal 130 at the timing or the number of times that power reduction can be most effectively performed.

In addition, it is needless to say that the present invention can be realized even when the operator of the power management server 120 and the operator of the incentive granting terminal 200 are different.

A program (application) for causing the user terminal 130 to perform the operation according to the above-described embodiment may be provided.

In the embodiments described above, the power usage of the consumer facility 170 is acquired through the A route from the power supplier server 100 to the smart meter 140. However, the present invention is not limited thereto, and the power usage of the consumer facility 170 may be acquired using the C route through the aggregator server 110 (or the power management server 120). Alternatively, the power usage of the consumer facility 170 may be acquired using both the A route and the C route.

Here, as the power usage of the consumer facility 170, the power usage before the power reduction request time period and the power usage in the power reduction request time period can be considered. Both the power usages may be acquired using the A route, and both the power usages may be acquired using the C route. Alternatively, one of the power usages may be acquired using the A route, and the other power usage may be acquired using the C route. There is no particular limitation on the route for acquiring power usage. In the embodiments described above, a case is illustrated in which the power usage before the power reduction request time period is acquired using the C route and the power usage before the power reduction request time period is acquired using the A route.

In the embodiments described above, the smart meter information includes at least one of the identification information of the smart meter 140 and the power usage measured by the smart meter 140. For example, in a case where the server (the power supplier server 100 or the power management server 120) has a function of accessing the smart meter 140, if the smart meter information includes the identification information of the smart meter 140, the server can acquire the power usage measured by the smart meter 140 by accessing the smart meter 140. In such a case, the smart meter information may include the identification information of the smart meter 140 without including the power usage measured by the smart meter 140. On the other hand, in a case where the server (the power supplier server 100 or the power management server 120) does not have a function of accessing the smart meter 140, even if the smart meter information includes the identification information of the smart meter 140, the server cannot access the smart meter 140. In such a case, the smart meter information may include the power usage measured by the smart meter 140 without including the identification information of the smart meter 140. Here, the power usage measured by the smart meter 140 may be the power usage before the power reduction request time period, or may be the power usage in the power reduction request time period.

In the embodiments, kW is used as the unit of power usage and actual reduced power. However, kWh may be used as the unit of power usage and actual reduced power. That is, the power usage and the actual reduced power may be replaced with electrical energy and reduced actual electrical energy, respectively.

Although not specifically mentioned in the embodiments, a program causing a computer to execute each process performed by the user terminal 130 may be provided. In addition, such a computer program may be recorded in a computer-readable recording medium. By using the computer-readable medium, it is possible to install the program in the computer. Here, the computer-readable medium in which the program is recorded may be a non-transitory recording medium. The non-transitory recording medium is not particularly limited, but may be a recording medium, such as a CD-ROM or a DVD-ROM, for example.

Alternatively, a chip configured by a memory, which stores a program for executing each process performed by the user terminal 130, and a processor for executing the program stored in the memory may be provided.

In addition, the entire contents of Japanese patent application No. 2014-261801 (filed on Dec. 25, 2014) and Japanese patent application No. 2015-089854 (filed on Apr. 24, 2015) are incorporated herein by reference.

INDUSTRIAL APPLICABILITY

According to the embodiments, it is possible to provide a server, a user terminal, and a program capable of appropriately controlling the power usage in response to a power control request from a power supplier.

The invention claimed is:
1. A server, which is associated with a service facility, comprising:
a notification unit that sends a power reduction request to a user terminal of a consumer; and
a controller that acquires smart meter information sent from the user terminal when the consumer accepts the power reduction request,
wherein
the smart meter information is information regarding a smart meter of a consumer facility that is a target for power reduction,
the controller determines actual reduced power of the consumer facility based on the smart meter information, when power usage of the consumer facility is reduced in response to the power reduction request, the controller performs a process of giving an incentive corresponding to the actual reduced power to the consumer, and when the consumer accepts the power reduction request, the incentive is given to the consumer based on an amount of money used in the service facility or time during which the consumer has stayed in the service facility.

2. The server according to claim 1, wherein the controller accesses the smart meter to determine the actual reduced power based on the smart meter information.

3. The server according to claim 1, wherein the smart meter information includes at least one of power usage measured by the smart meter and identification information of the smart meter.

4. The server according to claim 1, wherein in a time period in which power reduction is requested by the power reduction request, the controller acquires the smart meter information from the user terminal through a terminal device provided in the service facility.

5. The server according to claim 4, wherein a process of giving the incentive to the consumer through the terminal device is performed.

6. The server according to claim 1, wherein when transmitting the power reduction request to the consumer, the controller includes information regarding a facility that is a target for power reduction.

7. The server according to claim 6, wherein when the consumer accepts power reduction requests from a plurality of servers, including the server, the incentive is distributed among the plurality of servers based on an amount of money used in the service facility by the consumer or a time during which the consumer has stayed in the service facility, and wherein the server is associated with the plurality of servers.

8. A user terminal of a consumer, which communicates with a server associated with a service facility, comprising:

a controller that acquires smart meter information regarding a smart meter of a consumer facility that is a target for power reduction, when the consumer accepts a power reduction request from a server, wherein the controller notifies the server of the smart meter information, when power usage of the consumer facility is reduced in response to the power reduction request, the controller acquires an incentive corresponding to actual reduced power of the consumer facility, and when the consumer accepts the power reduction request, the incentive is given to the consumer based on an amount of money used in the service facility or time during which the consumer has stayed in the service facility.

9. The user terminal according to claim 8, wherein the smart meter information includes at least one of power usage measured by the smart meter and identification information of the smart meter.

10. The user terminal according to claim 8, wherein in a time period in which power reduction is requested by the power reduction request, the controller notifies the server of the smart meter information through a terminal device provided in the service facility, and acquires the incentive from the server through the terminal device.

11. A program causing a user terminal of a consumer, which communicates with a server associated with a service facility, to execute:

a step of acquiring smart meter information regarding a smart meter of a consumer facility that is a target for power reduction when the consumer accepts a power reduction request from a server;

a step of notifying the server of the smart meter information; and a step of acquiring an incentive corresponding to actual reduced power of the consumer facility, when power usage of the consumer facility is reduced in response to the power reduction request, wherein when the consumer accepts the power reduction request, the incentive is given to the consumer based on an amount of money used in the service facility or time during which the consumer has stayed in the service facility.

* * * * *